Oct. 20, 1936.  A. E. PAYSON ET AL  2,057,969

DOUBLE WALLED VACUUM RECEPTACLE

Filed Aug. 13, 1935

INVENTORS
AURIN E. PAYSON
ARTHUR H. PAYSON
CHARLES O. DUEVEL JR.
BY Adolph A. Thomas
ATTORNEY Patented Oct. 20, 1936

2,057,969

UNITED STATES PATENT OFFICE 2,057,969

DOUBLE-WALLED VACUUM RECEPTACLE

Aurin E. Payson, Norwichtown, and Arthur H. Payson and Charles O. Duevel, Jr., Norwich, Conn., assignors to The American Thermos Bottle Company, Norwich, Conn., a corporation of Ohio Application August 13, 1935, Serial No. 35,916

10 Claims. (Cl. 215—13)

Our invention relates to heat-insulated receptacles of the double-walled vacuum type, and its object is to provide a receptacle comprising two nested cylinders of different materials, such as glass for one cylinder and metal for the other, the two spaced cylinders being integrally united at the top by an alloy seal of the correct physical properties. This seal is of such composition that its coefficient of expansion is sufficiently close to that of the inner cylinder (which is the container proper) to give a durable weld free from excessive strain.

In double-walled vacuum bottles as heretofore made, the two cylinders or pistons are of glass and have substantially the same coefficient of expansion. Therefore, when a hot or cold liquid is poured into the bottle, the inner cylinder expands or contracts more than the outer cylinder, and this uneven movement of the cylinders is liable to produce so great a strain at the line of sealing that breakage may result. Furthermore, this double-walled all-glass unit must be mounted in an outer casing, thus adding to the expense of production.

To overcome the above and other objections in vacuum bottles of the all-glass type, we have devised a bottle in which the two cylinders are made of materials having different coefficients of expansion and integrally united at the top by an alloy seal whose coefficient of expansion is substantially equal or close to that of the inner cylinder. For example, the outer cylinder may be of metal, such as steel, and the inner cylinder of glass. The seal that unites the two cylinders is an alloy that follows practically the same thermal curve as the glass used. This makes it possible to form a permanent integral union between the inner glass container and the outer metal casing, to which the seal is fused or welded.

Another practical advantage of our new receptacle is this: by making the outer cylinder of metal (sheet steel, for example) we dispense with the separate casing necessary in vacuum bottles of the all-glass type, for the outer metal cylinder also acts as a protective casing for the bottle. This outer cylinder is formed with a base for supporting the bottle, and preferably we also provide the cylinder with integral screw threads adapted to receive a cup or cap.

To improve the heat-insulating properties of our glass-metal bottle, we coat the walls of the vacuum space between the two cylinders with a mirror-like surface adapted to reflect radiant energy. The glass may be silvered in the usual way, as by the chemical deposit of silver, and the metal cylinder may be electroplated with the reflectant metal. We shall subsequently describe several methods of silvering the walls of the vacuum space in our metal-glass unit.

The foregoing and other practical advantages and novel features of our invention will be understood from a description of the accompanying drawing, in which Fig. 1 is a vertical section of a bottle embodying our invention;

Figure 1:
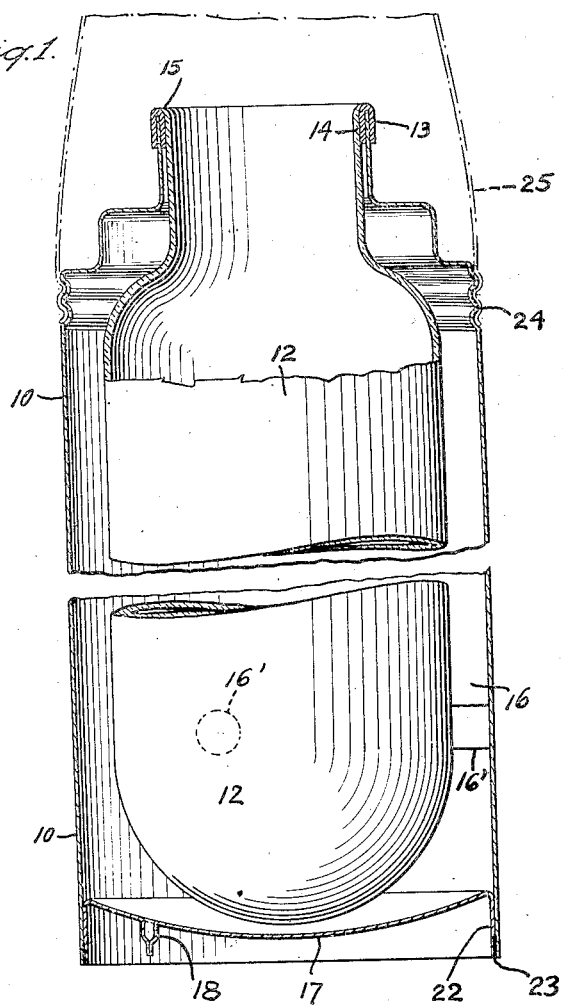
Figure 4:
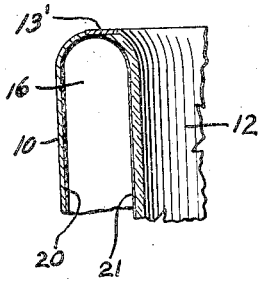
Fig. 4 shows a modified form of seal.
Figure 2:
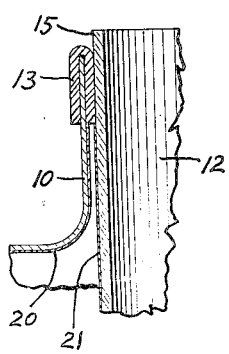
Figs. 2 and 3 are enlarged detail views showing how the glass and metal cylinders are sealed together at the top.
Figure 3:
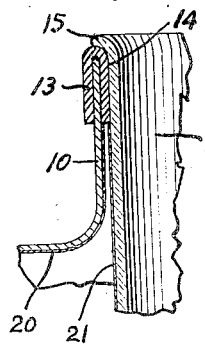
Figure 7:
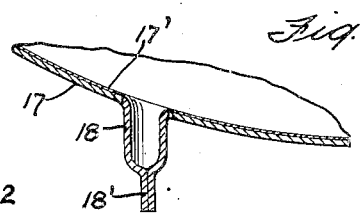

The bottle here shown by way of example consists of an outer cylinder 10 of metal and an inner cylinder 12 of glass. The two cylinders are integrally united at the top by an alloy seal 13, which is shown in Figs. 1–3 as a U-shaped ring or ferrule seated over the top rim of the metal cylinder 10 and welded or fused thereto so as to be substantially integral with the metal of the cylinder. The top section 14 of the inner glass cylinder 12 is fused to the seal 13 in an integral joint, the edge 15 of the glass being preferably bent down over the seal. In Fig. 4 the alloy seal 13' is in the form of a flat ring to which the rims of cylinders 10 and 12 are fused.

The outer metal cylinder 10 constitutes a casing and may be of any metal capable of being welded or fused to the sealing alloy 13. At the present time we prefer to make the outer cylinder 10 of steel, because it is the least expensive, has the requisite strength, and forms a durable joint with the sealing ring 13. The composition of this ring should have a coefficient of expansion so close to that of the glass cylinder 12 that no excessive strains will be produced at the joint of the two cylinders. Various metal compositions may be used for that purpose, and as suitable examples we may specify alloys of iron and nickel, iron and chromium, and iron, nickel and cobalt. These metals are combined in such proportions that the thermal expansion of the alloy has the correct value relative to the expansion coefficient of the inner cylinder 12. Here is an illustration of the expansion coefficients in a steel-glass unit: thermal expansions in cm/cm length at 475° C. produce an elongation in cm/cm of $5800 \times 10^{-6}$ for the steel casing, $4800 \times 10^{-6}$ for the glass (lime glass being used), and $5100 \times 10^{-6}$ for the sealing alloy. It will be understood that these figures are given merely as an example and not in a restrictive sense. It may also be mentioned that the seal 13 preferably should be such that molten glass will easily wet the surface, so as to produce a sealing contact of good adherence and gas-free.

It is desirable to have as much glass as possible in contact with the sealing ring 13, as shown in Figs. 1-3, where the bent-over lip 15 allows any vertical pull or pressure to be taken up by the glass itself. In joining the alloy 13 to the metal casing 10, the usual way is to weld them together. However, in those instances where welding would be too expensive, a glass or enamel of low melting point is deposited between the two dissimilar metals of parts 10 and 13, and is heated so as to melt the mass into a homogeneous body. In this way the alloy 13 becomes integrally united to the metal casing 10 in a vacuum-tight seal, which can be heated to a temperature to allow the unit to be degasified.

Figure 5:
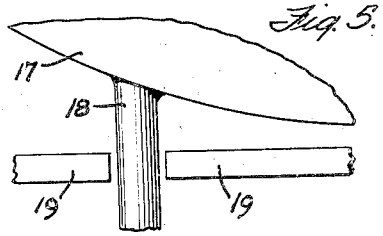
Figs. 5–7 illustrate how the metal exhaust tube on the outer metal cylinder is fused or welded into a vacuum-tight joint.
Figure 6:
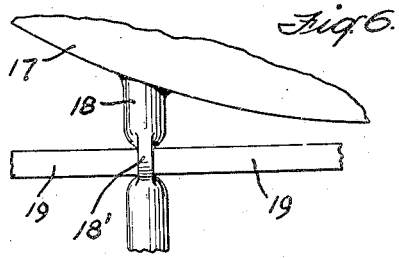

The space 16 between the nested cylinders 10 and 12 is exhausted of air to render it heat-insulating. For this purpose, the metal bottom 17 of the outer casing 10 is provided with a metal tube 18. The parts 17 and 18, like the part 10, may be of steel, but any other suitable metal may be used. The tube 18, which is welded to bottom 17, is connected with a pump for exhausting the air from space 16 to the desired degree. Thereupon a section 18' of the tube is constricted, as by rolling, drawing, or bringing the pressure electrodes 19 together (see Fig. 6). Current is then applied to the electrodes, whereby the compressed section 18' is fused or welded into an integral vacuum-tight joint, and this may be done while the tube is still connected to the exhaust apparatus, as will be clear from Figs. 5-6. Any superfluous length of tube below the fused section is cut off. The usual spacing pads 10' may be used to strengthen the inner cylinder against lateral shocks.

We prefer to coat the walls of space 16 with a mirror-like surface for the reflection of radiant energy to improve the heat-insulation of the bottle. The coating 20 on the inner wall of the metal casing 10 may be an electroplating, and the coating 21 on the outer wall of the glass container 12 may be a chemical deposit of silver. The following procedure may be used: first, a layer of silver of sufficient thickness is deposited chemically on the outer wall of glass cylinder 12. Then, using that silver deposit as an anode, a portion thereof is electroplated on to the inner wall of metal casing 10. These operations are done after the two cylinders are sealed together.

Another suitable method of forming the reflecting surfaces 20 and 21 after the cylinders 10 and 12 have been united, consists in electrically vaporizing the metal on to the surfaces after the space 16 has been exhausted, the vaporized metal being drawn into the evacuated space where it is automatically deposited on the surrounding walls, after which the space between the walls is re-evacuated. The temperature of these walls is properly controlled to assure a uniform deposit of the metal vapor. We may also employ an electrostatic field of varying density for drawing the metal vapor from the bottom to the top of the vacuum chamber 16.

A third form of procedure for coating the united cylinders 10 and 12 (but with the bottom 17 left off) consists in placing them inside a vacuum chamber and vaporizing the metal in the chamber. The bottom 17 is coated separately, as indicated at 17', and is then electrically fused or welded to the outer casing 10.

Referring to Fig. 1, it will be seen that the curved bottom piece 17 is sufficiently above the lower end of casing 10 to accommodate and conceal the exhaust tube 18. The bottom 17 is preferably formed with an integral cylindrical rim 22, which is in contact with the adjacent wall of casing 10 and is welded thereto, as diagrammatically indicated at 23. There is thus formed a circular wall of double thickness at the base of the outer casing for supporting the bottle. If desired, the metal casing 10 may have integral screwthreads 24 for supporting a combined cap and cup 25. The metal member 10 thus performs the double function of the outer wall of the vacuum unit 10—12 and the outer casing of the finished bottle.

Although we have shown and described certain specific constructions, we would have it understood that our invention is not limited to the details set forth, for various changes and modifications are possible within the scope of the appended claims. In describing our invention as a bottle, we use that term in its broadest possible sense, including any practical receptacle of the type represented by bottles, jars, and the like.

We claim as our invention:

1. A double-walled vacuum bottle consisting of a metal cylinder and a glass cylinder in nested spaced relation, the two cylinders terminating at substantially the same height and having their top rims closely adjacent, and a metal seal welded to and integrally uniting the adjacent top rims of said cylinders, said metal seal having a coefficient of expansion close to that of the glass cylinder, which contacts the metal seal flatwise over a considerable area to produce a strong weld substantially unaffected by vibrations of the glass cylinder.

2. A double-walled vacuum bottle consisting of a metal cylinder and a glass cylinder in nested spaced relation, the two cylinders terminating at substantially the same height and having their top rims closely adjacent, there being a narrow annular space between said adjacent top rims, and a metal seal welded to and integrally uniting the adjacent top rims of said cylinders, said metal seal comprising an alloy ring which fills said narrow annular space and has a coefficient of expansion close to that of the glass cylinder, said ring and the top rim of the glass cylinder being in sealing contact flatwise over a considerable area to produce a strong weld substantially unaffected by vibrations of the glass cylinder.

3. A double-walled vacuum bottle consisting of a metal cylinder and a glass cylinder in nested spaced relation, the two cylinders terminating at substantially the same height and having their top rims closely adjacent, there being a narrow annular space between the adjacent top rims, and a metal seal welded to and integrally uniting the adjacent top rims of said cylinders, said metal seal being an inverted U-shaped ring seated on top of the metal cylinder and having a coefficient of expansion close to that of the glass cylinder, the inner cylindrical wall of said ring filling said narrow annular space and being sealed flatwise to the contiguous surface of the glass cylinder over a considerable area to produce a strong weld substantially unaffected by vibrations of the glass cylinder.

4. A double-walled vacuum bottle consisting of a metal cylinder and a glass cylinder in nested spaced relation, the two cylinders terminating at substantially the same height and having their top rims closely adjacent, there being a narrow annular space between the adjacent top rims, and a metal seal welded to and integrally uniting the adjacent top rims of said cylinders, said metal seal being an inverted U-shaped ring seated on top of the metal cylinder and having a coefficient of expansion close to that of the glass cylinder, the inner wall of said ring filling said narrow annular space and being sealed to the contiguous surface of the glass cylinder, the top rim of the glass cylinder terminating in an outwardly flaring lip which overlaps the top of said U-shaped ring and is welded thereto, whereby said sealing ring and glass cylinder contact flatwise over a considerable area to produce a strong weld substantially unaffected by vibrations of the glass cylinder.

5. A double-walled vacuum bottle consisting of a metal cylinder and a glass cylinder in nested spaced relation, the two cylinders terminating at substantially the same height and having their top rims closely adjacent, a metal seal welded to and integrally uniting the adjacent top rims of said cylinders, said metal seal having a coefficient of expansion close to that of the glass cylinder, which contacts the metal seal flatwise over a considerable area to produce a strong weld substantially unaffected by vibrations of the glass cylinder, and mirror-like coatings on the metal and glass walls forming the space between the cylinders for the reflection of radiant energy.

6. A double-walled vacuum bottle consisting of an outer casing of sheet metal and an inner container of glass, said metal casing and glass container terminating at substantially the same height and having their top rims closely adjacent, said top rims being integrally united by means of an interposed metal seal which fills the narrow annular space between the adjacent top rims, and a closed bottom section secured within the lower end of said casing, said bottom section having an integral cylindrical flange welded to the casing to form a wall of double thickness for supporting the bottle in upright position, said flange extending downward from the main body of the section so as to be fully exposed for welding to the casing.

7. In the manufacture of double-walled vacuum bottles, the method of integrally uniting a metal cylinder and a glass cylinder in nested spaced relation, which comprises sealing an alloy ring to the rim of the metal cylinder, inserting the glass cylinder into the metal cylinder, the nested cylinders terminating at substantially the same height and having their top rims closely adjacent, said sealing ring and inner glass cylinder presenting annular contact surfaces flatwise to each other over a considerable area, and sealing said contact surfaces together to produce a strong weld substantially unaffected by vibrations of the glass cylinder, said ring having the correct physical properties to give a durable seal free from excessive strain.

8. In the manufacture of double-walled vacuum bottles comprising a pair of nested spaced cylinders of which the outer one is steel and has a steel exhaust tube through which the air is exhausted, said tube having excess length for connecting it with an evacuating device, the method of sealing said steel tube which comprises the steps of constricting a flat section of the metal tube after the exhaustion of air from said space, electrically welding the flat constricted section into a homogeneous mass of steel to form an integral vacuum-tight seal, and cutting off the sealed tube below said welded section.

9. In the manufacture of double-walled vacuum bottles comprising a pair of nested spaced cylinders of which the outer one is metal and has a metal exhaust tube through which the air is exhausted, said tube having sufficient length for connection with a source of exhaust, the method of sealing said metal tube by first compressing an intermediate section of the tube between a pair of pressure electrodes after the exhaustion of air from the space between the cylinders, and then applying current to the electrodes for fusion of the compressed section.

10. In the manufacture of double-walled vacuum bottles, the method which comprises sealing an outer metal cylinder and an inner glass cylinder together at the top in nested spaced relation, the bottom end of the outer metal cylinder being left open, chemically depositing a silver coating of sufficient thickness on the outer wall of the glass cylinder, electroplating the inner wall of the metal cylinder with silver by using the silver coating on the glass cylinder as an anode, the coated surfaces forming the walls of the annular space between the nested cylinders, exhausting the air from said annular space, and sealing the exhausted space.

AURIN E. PAYSON.
ARTHUR H. PAYSON.
CHARLES O. DUEVEL, Jr.